(12) United States Patent
Hama et al.

(10) Patent No.: US 6,944,481 B2
(45) Date of Patent: Sep. 13, 2005

(54) FOLDING COMMUNICATION TERMINAL HAVING TWO DISPLAYS

(75) Inventors: Mitsuji Hama, Higashiosaka (JP); Tadahiro Emoto, Kobe (JP); Kenji Kiyota, Shijonawate (JP)

(73) Assignee: Sanyo Electric Co., Ltd., Osaka (JP)

( * ) Notice: Subject to any disclaimer, the term of this patent is extended or adjusted under 35 U.S.C. 154(b) by 419 days.

(21) Appl. No.: 09/962,401

(22) Filed: Sep. 25, 2001

(65) Prior Publication Data

US 2002/0037754 A1 Mar. 28, 2002

(30) Foreign Application Priority Data

Sep. 25, 2000 (JP) ........................................ 2000-291152

(51) Int. Cl.[7] ................................................. H04B 1/38
(52) U.S. Cl. .................. 455/566; 455/575.3; 455/412.2
(58) Field of Search ............................. 455/403, 412.2, 455/418, 550.1, 566, 567, 575.1, 575.3, 90.1, 90.3; 379/93.17, 93.23, 428.01, 433.01, 433.04; 345/1.1–1.2, 169–170

(56) References Cited

U.S. PATENT DOCUMENTS

| | | | | |
|---|---|---|---|---|
| 6,125,286 A | * | 9/2000 | Jahagirdar et al. | ........... 455/566 |
| 6,304,763 B1 | * | 10/2001 | Jahagirdar et al. | ........... 455/566 |
| 6,381,474 B1 | * | 4/2002 | Kraft | ........................... 455/566 |
| 6,466,292 B1 | * | 10/2002 | Kim | ........................... 349/143 |
| 6,697,083 B1 | * | 2/2004 | Yoon | ........................... 345/658 |

* cited by examiner

Primary Examiner—George Eng

(57) ABSTRACT

A folding-type communication terminal includes a first display unit which is positioned so as to be visible when a main body of the communication terminal is in a folded state; a second display unit which is positioned so as to be concealed when the main body is in the folded state; a storage unit for storing at least one set of a piece of first information and a piece of second information, the piece of first information (i) having been generated based on information received accompanying incoming-communication, the incoming-communication being at least one of an unanswered incoming-call and incoming-mail, the incoming-mail being one of electronic mail and a character message and (ii) showing existence of the received information, and the second information showing details of the received information; a detection unit for detecting that the main body has been put into an unfolded state; a first display control unit for having the piece of first information displayed on the first display unit; and second display control unit for having the piece of second information displayed on the second display unit, when the detection unit detects that the main body has been put into the unfolded state while the piece of first information is being displayed on the first display unit, wherein the piece of second information belongs to a same set as the piece of first information.

19 Claims, 12 Drawing Sheets

Fig.5

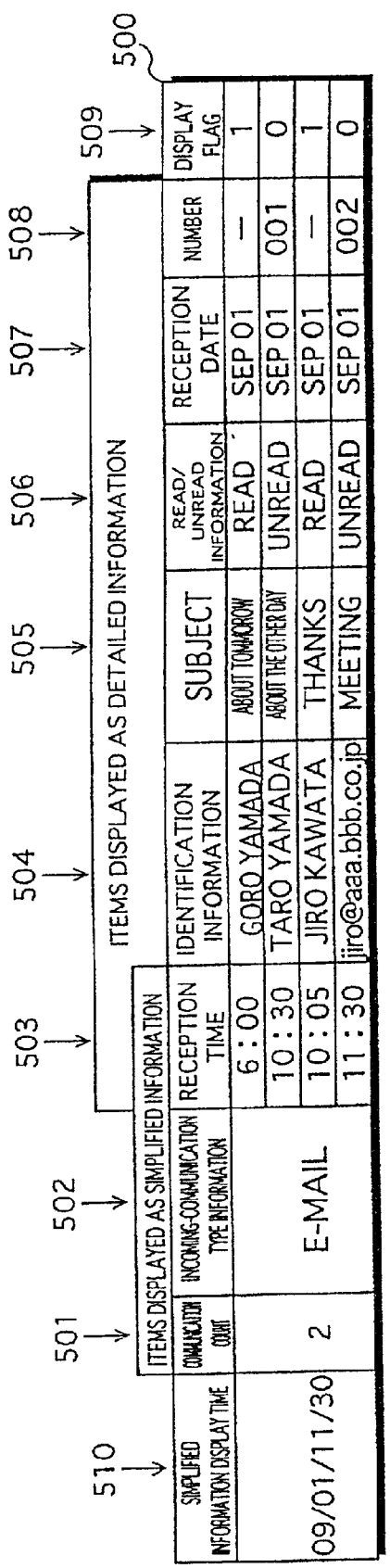

| SIMPLIFIED INFORMATION DISPLAY TIME | ITEMS DISPLAYED AS SIMPLIFIED INFORMATION | | | ITEMS DISPLAYED AS DETAILED INFORMATION | | | | | |
|---|---|---|---|---|---|---|---|---|---|
| | COMMUNICATION COUNT | INCOMING-COMMUNICATION TYPE INFORMATION | RECEPTION TIME | IDENTIFICATION INFORMATION | SUBJECT | READ/UNREAD INFORMATION | RECEPTION DATE | NUMBER | DISPLAY FLAG |
| 09/01/11/30 | 2 | E-MAIL | 6:00 | GORO YAMADA | ABOUT TOMORROW | READ | SEP 01 | — | 1 |
| | | | 10:30 | TARO YAMADA | ABOUT THE OTHER DAY | UNREAD | SEP 01 | 001 | 0 |
| | | | 10:05 | JIRO KAWATA | THANKS | READ | SEP 01 | — | 1 |
| | | | 11:30 | jiro@aaa.bbb.co.jp | MEETING | UNREAD | SEP 01 | 002 | 0 |

(A)

(B) CALL 1 10:00

(C) E-MAIL 1 10:30

(D) C-MAIL 1 11:00

(E) E-MAIL 2 11:30

Fig.8
(A)
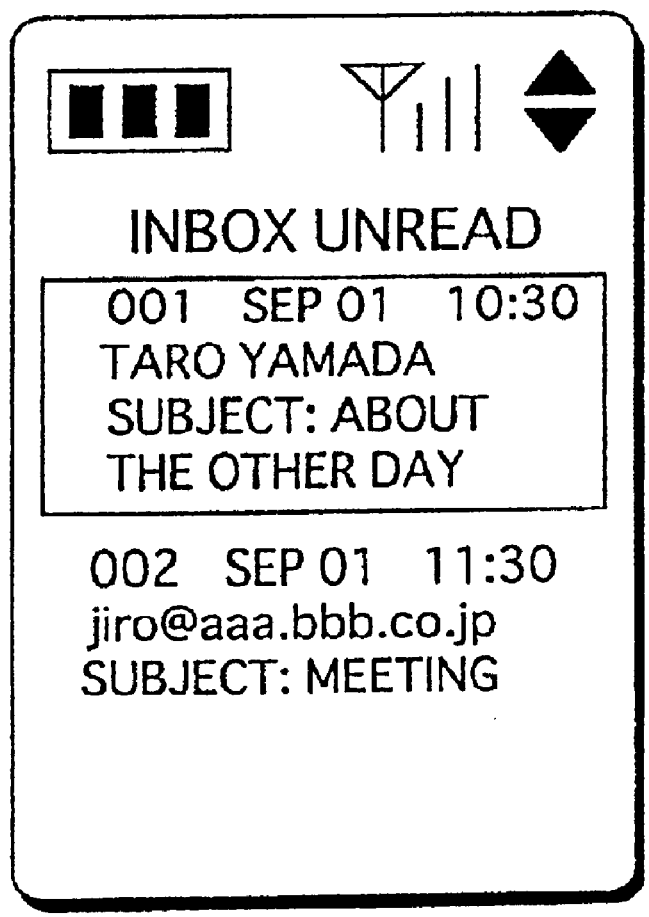
(B) 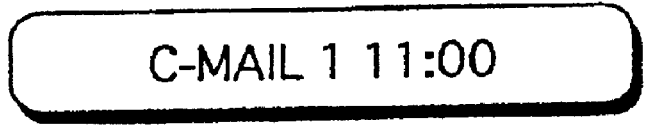

Fig.9
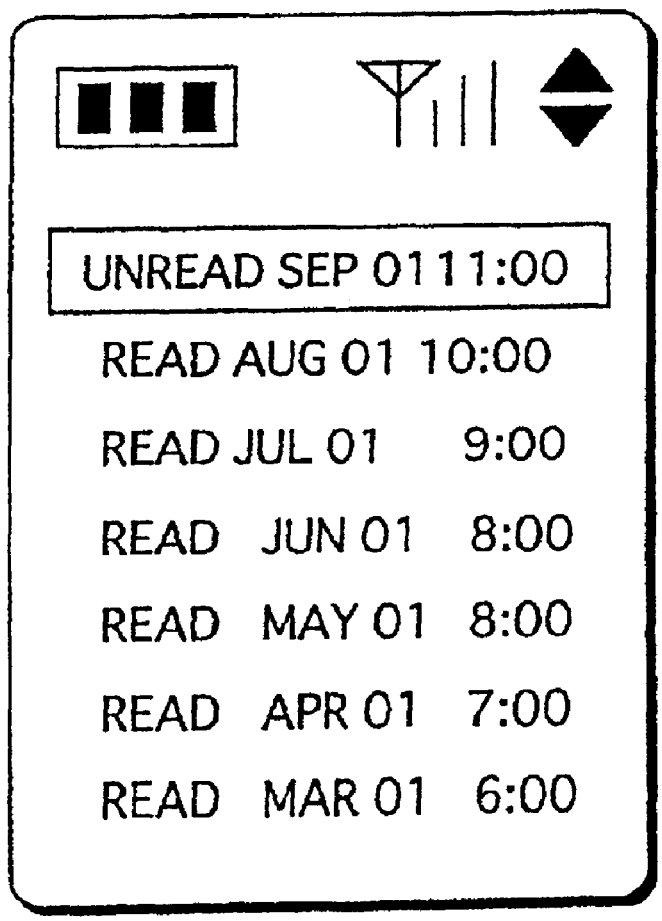
(A)
(B)

Fig.10
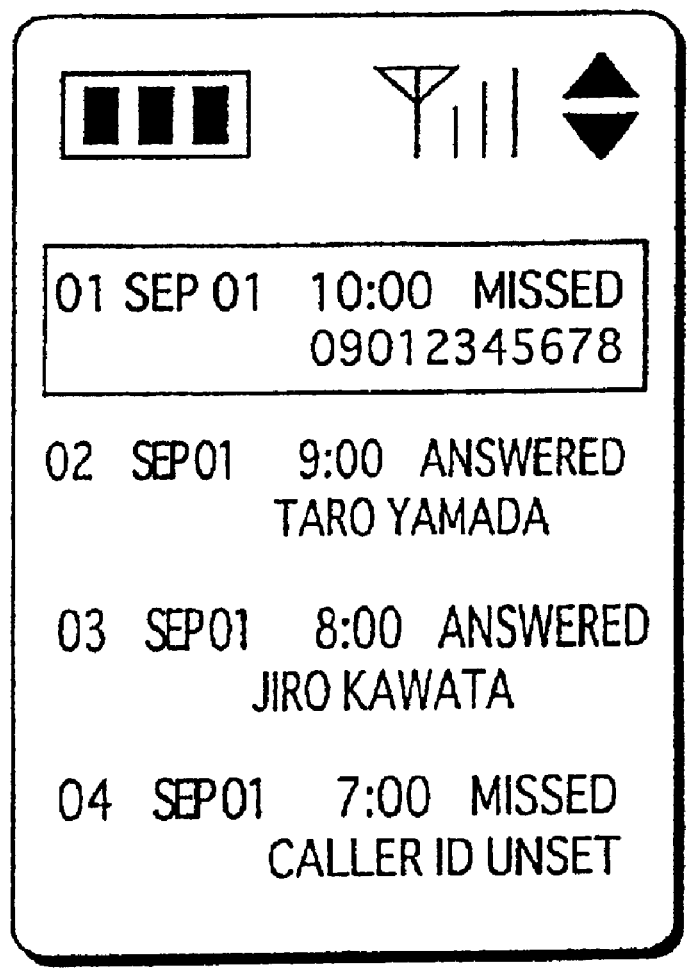
(A)
(B) 

FOLDING COMMUNICATION TERMINAL HAVING TWO DISPLAYS

BACKGROUND OF THE INVENTION (1) Field of the Invention

The present invention relates to a foldable communication terminal apparatus, and in particular to a technique for controlling display of content on a display, accompanying opening and closing of the foldable communication terminal.

(2) Description of the Prior Art

In recent years mobile communication devices such as PHS (Personal Handy phone System), PDC (Personal Digital Cellular telecommunication system), and CDMA (Code Division Multiple Access) have become common because of decreases in their size and weight, improvement in their communication quality, and reduction of the price of the devices themselves and of call charges. Currently, such devices are enjoying great popularity amongst young people.

In particular, folding mobile communication devices (hereinafter "folding communication terminal(s)") which are fashionable and allow for easy operation are popular, resulting in a trend of manufacturers competing against each other to sell folding communication terminals.

A "Selective Radio Call Receiver" disclosed in Japanese Laid-Open Patent Application H6-132876 and a "Portable Telephone Set With Automatically Adjusting Function For Incoming Tone" disclosed in Japanese Laid-Open Patent Application H8-307488 are examples of such conventional folding communication terminals.

These applications disclose techniques for stopping the ringer when there is an incoming-call on detecting that the apparatus has been opened from a folded state.

Furthermore, Japanese Laid-Open Patent Application H11-74953 "Radio Communication Equipment" discloses a folding communication terminal apparatus which has, in addition to a display which is positioned so that it can only be seen when the housing is open and is for displaying information during ordinary use (hereinafter "main display"), an auxiliary display which if for displaying limited information (hereinafter "sub-display") such as notification of incoming-communication, even when the housing is folded. Here, the maximum number of characters that can be displayed on the sub-display is less than the main display.

However, with such a folding communication terminal, the user must perform cumbersome operations in order to confirm detailed information about who the caller is and so on. The user must first open the housing to have the initial screen displayed on the main display, then locate guidance for confirming the information, and push buttons according to the guidance.

SUMMARY OF THE INVENTION

In view of the stated problem, the first object of the present invention is to provide a folding communication terminal apparatus which, when part of information concerning incoming-communication is displayed on the sub-display, gives more detailed information that is obtainable without cumbersome operations by the user.

In addition, a second object of the present invention is to provide an information display method which makes the stated detailed information obtainable without cumbersome operations by the user. Furthermore, a third object of the present invention is to provide a program for displaying the stated detailed information without cumbersome operations by the user.

Moreover, a fourth object of the present invention is to provide an open/close-type communication terminal similar to the stated folding communication terminal, that, when part of information concerning incoming-communication is displayed on the sub-display, gives more detailed information that is obtainable without cumbersome operations by the user. Here, the open/close-type communication terminal has a lid which covers a main body of the communication terminal, the lid opening and closing by sliding, or pivoting on a hinge to which the lid is attached.

In order to achieve the stated first objective, a folding communication terminal of the present invention includes a first display unit which is positioned so as to be visible when a main body of the communication terminal is in a folded state; a second display unit which is positioned so as to be concealed when the main body is in the folded state; a storage unit for storing at least one set of a piece of first information and a piece of second information, the piece of first information (i) having been generated based on information received accompanying incoming-communication, the incoming-communication being at least one of an unanswered incoming-call and incoming-mail, the incoming-mail being one of electronic mail and a character message and (ii) showing existence of the received information, and the second information showing details of the received information; a detection unit for detecting that the main body has been put into an unfolded state; a first display control unit for having the piece of first information displayed on the first display unit; and a second display control unit for having the piece of second information displayed on the second display unit, when the detection unit detects that the main body has been put into the unfolded state while the piece of first information is being displayed on the first display unit, wherein the piece of second information belongs to a same set as the piece of first information.

According to the stated construction, by checking the piece of first information which is displayed on the first display control means which is in an easily-viewable position, the user is able to easily recognize the existence of the information received accompanying the incoming communication. Furthermore, since the second information, which shows details of the received information, is displayed by opening the main body, the user is able to check the details promptly.

Furthermore, the first display control unit may further terminate a display of the piece of first information on the first display unit, after the detection unit detects that the main body has been put into the unfolded state.

According to the stated construction useless displaying can be avoided when the second information is seen, meaning that it is not necessary to display the first information. This allows for improved power conservation.

Furthermore, the detection unit may further detect that the main body has been put into the folded state, and the first display control unit may have, after the detection unit detects that the main body has been put into the folded state, another piece of first information displayed on the first display unit until the detection unit detects that the main body has been put into the unfolded state.

According to the stated construction, when the main body is put into a folded state, a different piece of first information to that which was displayed on the first display unit until the main body was opened is displayed, meaning that a new piece of information is obtained.

Furthermore, the first display control unit may prohibit the piece of first information from being displayed again on the first display unit after the display of the piece of first information has been terminated.

According to the stated construction, a piece of first information which corresponds to second information which has been displayed is not displayed, and a piece of first information which corresponds to an undisplayed piece of second information is displayed. This means that the undisplayed piece of second information can be displayed with priority.

Furthermore, the communication terminal may further include a generation unit for generating, when the incoming-communication is received, the set of the pieces of information based on the information received accompanying the incoming-commnunication, wherein the first display control unit has, when the generation unit has generated the set of pieces of information the piece of first information displayed on the first display unit in place of a piece of first information that was being displayed on the first display unit when the incoming-communication was received.

According to the stated construction, when there is incoming-communication a piece of first information showing the existence of information received accompanying the incoming-communication is displayed on the first display unit, meaning that the user is prompted to have the piece of second information showing the details of the received information displayed quickly.

Furthermore, the folding communication terminal may further include a display sequence storage unit for storing a display sequence showing an order in which pieces of first information have been displayed on the first display unit up until a present time, wherein a piece of first information to be displayed after the detection unit detects that the main body has been put into the folded state is a piece of first information that is one before in the display sequence to a piece of first information that was being displayed until the detection unit detected that the main body had been put into the folded state.

According to the stated construction, the pieces of first information are displayed in order of reception time of the incoming-communication, starting with the latest, so even if there are numerous sets stored in the storage unit and most of the sets are about old incoming-communication, the information is displayed starting with recent information which is assumed not to have become out of date. This means that information display is more effective.

Furthermore, in order to achieve the stated second object, the present invention is an information display method for displaying information, being for use with a folding-type communication terminal including (a) a first display unit which is positioned so as to be visible when a main body of the communication terminal is in a folded state, (b) a second display unit which is positioned to as to be concealed when the main body is in the folded state, and (c) a storage unit, the information display method including a detection step for detecting that the main body has been put into an unfolded state; a generation step for generating, when incoming-communication is received, a set of a piece of first information and a piece of second information, and storing the generated set in the storage means, the piece of first information (i) being generated based on information received accompanying the incoming-communication, the incoming-communication being at least one of an unanswered incoming-call and incoming-mail, the incoming-mail being one of electronic mail and a character message and (ii) showing existence of the received information, and the second information showing details of the received information; a first display step for having the piece of first information displayed on the first display unit; and a second display step for having the piece of second information displayed on the second display unit, after the detection step detects that the main body has been put into the unfolded state while the piece of first information is being displayed on the first display unit, wherein the piece of second information corresponds to the piece of first information.

Accordingly, by checking the piece of first information which is displayed on the first display means which is in an easily-viewable position, the user is able to easily recognize the existence of the information received accompanying the incoming-communication. Furthermore, since the second information, which shows details of the received information, is displayed by opening the main body, user is able to check the details promptly.

Furthermore, the information display method may further include a display termination step for terminating a display of the piece of first information on the first display unit, after the detection step detects that the main body has been put into the unfolded state.

Accordingly, wasteful displaying can be avoided when the second information is seen because it is not necessary to display the first information. This allows for improved power conservation.

Furthermore, the storage unit may store a plurality of sets, and the information display method may further include a folded detection step for detecting that the main body has been put into the folded state; and a third display step for having, after the folded detection step detects that the main body has been put into the folded state, another piece of first information displayed on the first display unit until the main body is detected to have been put into the unfolded state.

Accordingly, when the main body is put into a folded state, a different piece of first information to that which was displayed on the first display unit until the main body was opened is displayed, meaning that a new piece of information is obtained.

Furthermore, the information display method may further include a prohibition step for prohibiting the piece of first information from being displayed again on the first display unit after the display of the piece of first information has been terminated.

Accordingly, a piece of first information which corresponds to second information which has been displayed is not displayed, and a piece of first information which corresponds to an undisplayed piece of second information is displayed. This means that the undisplayed piece of second information can be displayed with priority.

Furthermore, the information display method may further include a fourth display step for displaying, when the generation step has generated the set of the pieces of information, the piece of first information which belongs to the generated set of pieces of information on the first display unit in place of a piece of first information that was being displayed on the first display unit when the incoming-communication was received.

Accordingly, when there is incoming-communication a piece of first information showing the existence of information received accompanying the incoming-communication is displayed on the first display unit which is in an easily-viewable position, meaning that the user is prompted to have the piece of second information about the incoming-communication displayed quickly.

Furthermore, the folding communication terminal may further include a display sequence storage unit for storing a display sequence showing an order in which pieces of first information have been displayed on the first display unit up until a present time, and in the fourth step, a piece of first information to be displayed after the main body is detected to have been put into the folded state may be a piece of first information that is one before in the display sequence to a piece of first information that was being displayed when the detection unit detects that the main body had been put into the folded state.

Accordingly, the pieces of first information are displayed in order of reception time of the incoming-communication, starting with the latest, so even if there are numerous sets stored in the storage unit and most of the sets are about old incoming-communication, the information is displayed starting with recent information which is assumed not to have become out of date. This means that information display is more effective.

Furthermore, in order to achieve the stated third object, the present invention is a computer-readable program for displaying information on a folding-type communication terminal, the communication terminal comprising (a) a first display unit which is positioned so as to be visible when a main body of the communication terminal is in a folded state, (b) a second display unit which is positioned so as to be concealed when the main body is in the folded state, and (c) a storage unit, the program including a detection step for detecting that the main body has been put into an unfolded state; a generation step for generating, when incoming-communication is received, a set of a piece of first information and piece of second information, and storing the generated set in the storage means, the piece of first information (i) being generated based on information received accompanying the incoming-communication, the incoming-communication being at least one of an unanswered incoming-call and incoming-mail, the incoming-mail being one of electronic mail and a character message and (ii) showing existence of the received information, and the second information showing details of the received information; a first display step for having the piece of first information displayed on the first display unit; and a second display step for having the piece of second information displayed on the second display unit, after the detection step detects that the main body has been put into the unfolded state while the piece of first information is being displayed on the first display unit, wherein the piece of second information corresponds to the piece of first information.

Accordingly, by checking the piece of first information which is displayed on the first display control means which is in an easily-viewable position, the user is able to easily recognize the existence of the information received accompanying the incoming communication. Furthermore, since the second information, which shows details of the received information, is displayed by opening the main body, user is able to check the details promptly.

Furthermore, in order to achieve the stated fourth object, an open/close-type communication terminal of the present invention has a lid which covers a main body of the communication terminal, the lid opening and closing by (a) sliding, or (b) pivoting on a hinge to which the lid is attached, including a first display unit which is positioned so as to be visible when the lid is in a closed state; a second display unit which is positioned so as to be concealed when the lid is in the closed state; a storage unit for storing at least one set of a piece of first information and a piece of second information, the piece of first information (i) having been generated based on information received accompanying incoming-communication, the incoming-communication being at least one of an unanswered incoming-call and incoming-mail, the incoming-mail being one of electronic mail and a character message and (ii) showing existence of the received information, and the second information showing details of the received information; a detection unit for detecting that the lid has been put into an open state; a first display control unit for having the piece of first information displayed on the first display unit; and a second display control unit for having the piece of second information displayed on the second display unit, when the detection unit detects that the lid has been put into the open state while the piece of first information is being displayed on the first display unit, wherein the piece of second information belongs to a same set as the piece of first information.

According to the stated construction, by checking the piece of first information which is displayed on the first display control means which is in an easily-viewable position, the user is able to easily recognize the existence of the information received accompanying the incoming communication. Furthermore, since the second information, which shows details of the received information is displayed by opening the main body, the user is able to check the details promptly.

BRIEF DESCRIPTION OF THE DRAWINGS

These and other objects, advantages and features of the invention will become apparent form the following description thereof taken in conjunction with the accompanying drawings which illustrate a specific embodiment of the invention. In the drawings:

FIG. 5 shows the data structure of a table for registering incoming-mail history information;

FIG. 8 shows a display state of the main display if the housing is opened while incoming-mail history information is displayed on the sub-display, and the subsequent display state of the sub-display if the housing is then closed;

FIG. 9 shows a display state of the main display if the housing is opened while incoming-message history information is displayed on the sub-display, and the subsequent display state of the sub-display if the housing is then closed;

FIG. 10 shows a display state of the main display if the housing is opened while incoming-call history information is displayed on the sub-display, and the subsequent display state of the sub-display if the housing is then closed;

DESCRIPTION OF THE PREFERRED EMBODIMENT

The following explains a folding communication terminal 100 in an embodiment of the present invention with reference to the drawings.

<Structure>

Figure 1:
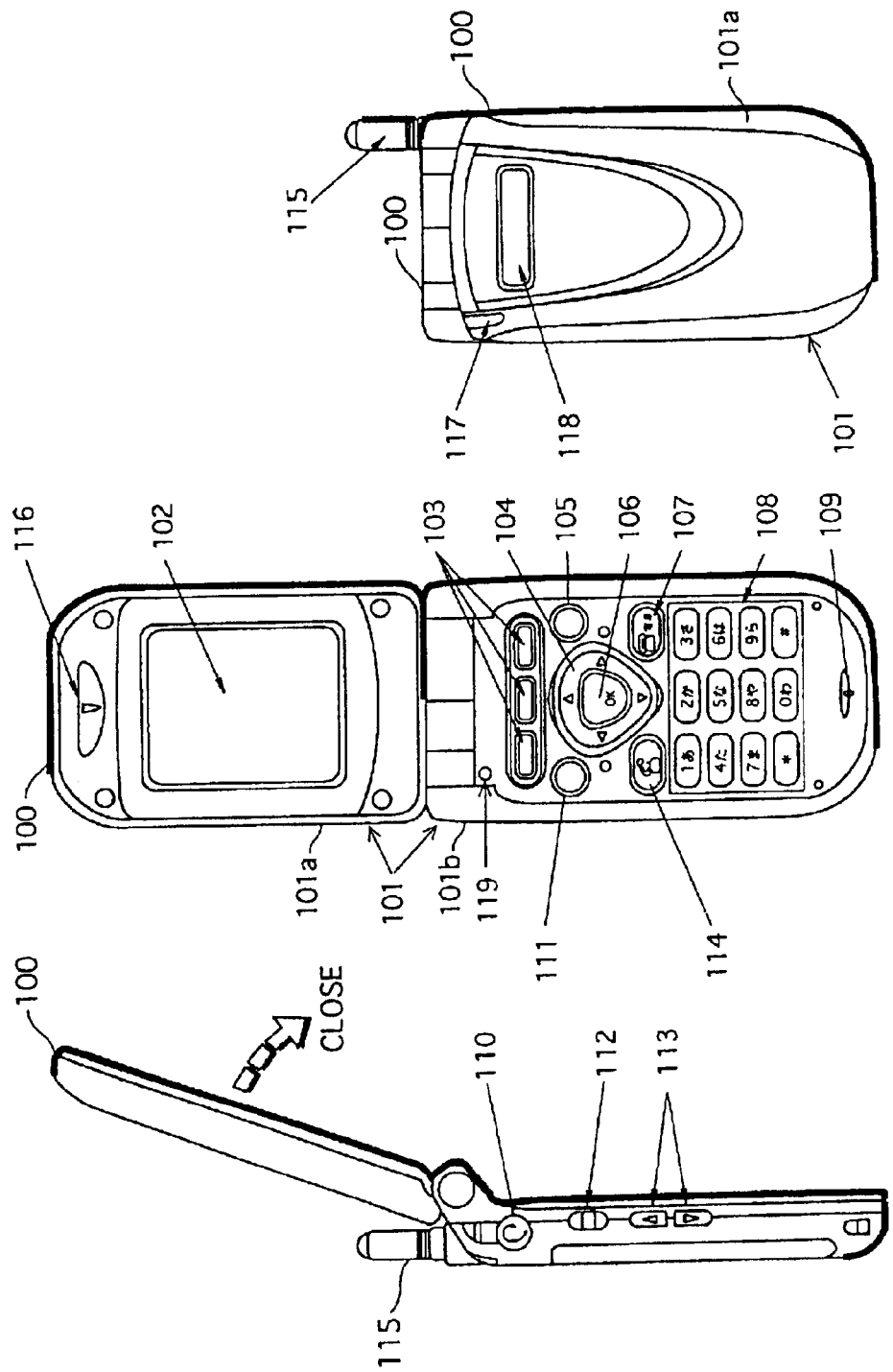
FIG. 1(a) is a front view of the folding communication terminal of the present invention.
FIG. 1(b) is a side view of the folding communication terminal of the present invention when open.
FIG. 1(c) is front view of the folding communication terminal of the present invention when closed.

FIG. 1 shows outer views of the folding communication terminal 100 of the present invention.

The folding communication terminal 100 is an IS (Interim Standard)-95 CDMA (Code Division Multiple Access) foldable portable telephone of which FIG. 1a shows a front view when open, FIG. 1b shows a left side view when open, and FIG. 1c shows a front view when closed.

Visible parts of the folding communication terminal 100 are housing 101, a main display 102, flexible keys 103, a 4-position key 104, an e-mail key 105, a menu/OK key 106, an end/power key 107, a numeric key pad 108, a microphone 109, an earphone terminal cover 110, a web key 111, a side OK key 112, a side scroll key 113, a start key 114, an antenna 115, a speaker 116, an incoming-communication lamp 117, a sub-display 118, and an open/close detection switch 119.

The housing 101 is foldable housing made of resin and so on and has a hinge in the center. The housing unit 101 is made up of top housing 101a and bottom housing 101b.

The main display 102 and the speaker 116 are on the inner face of the top housing 101a, while the incoming-call lamp 117 and the sub-display 118 are on the outer face of the top housing 101a.

Here the inner face refers to the face of the housing unit 101 that cannot be seen when the folding communication terminal is completely closed.

The earphone terminal cover 110, the side OK key 112, and the side scroll key 113 are on the left side of the lower housing 101b.

The flexible key 103, the 4-position key 104, the e-mail key 105, the menu/OK key 106, the end/power key 107, the numeric key pad 108, the microphone 109, the web key 111, the start key 114, and the open/close detection switch 119 are on the front inner face of the bottom housing 101b.

The main display 102 is a color LCD (Liquid Crystal Display) which can display approximately 100 characters without scrolling.

Visual information displayed on the main display 102 includes details about information regarding incoming-communication history (hereinafter "detailed information") which cannot be fully displayed on the sub-display 118 (which will be explained later).

The detailed information includes information such as a telephone number or an e-mail address of a caller/sender when a call, e-mail or so-called c-mail (a type of electronic mail which is shorter than e-mail) is received, and also other information which can be obtained consequently such as the caller's/sender's name.

The flexible keys 103 are three switches which are for selecting display items on the main display 102 which correspond respectively to the positions in which the switches are placed.

The 4-position key 104 moves up, down, left, and right to move the cursor and scroll items displayed on the main display 102.

The e-mail key 105 is a pushbutton switch for having an electronic mail function screen displayed.

The menu/OK key 106 is a pushbutton switch for proceeding to items in the menu and confirming selected items.

The end/power key 107 is a pushbutton switch for turning the power to the folding communication terminal on and off, and for ending calls.

The numeric key pad 108 is a group of 12 pushbutton switches, each of which corresponds to a number and/or one or more characters. These pushbutton switches are for inputting characters for telephone numbers, e-mail, and so on.

The microphone 109 converts input voices into electric signals (hereinafter "voice signal(s)"), and outputs the voice signals to a voice processing unit 124 which will be explained later.

The earphone terminal cover 110 protects an earphone terminal (not illustrated).

The web key 111 is a pushbutton switch for proceeding to a display screen for an Internet connection function.

The side OK key 112 is a sliding switch for memo reproduction, voice recording, and confirming a selected item.

The scroll key 113 consists of 2 button switches, and is for scrolling displayed pages up and down.

The start key 114 is a button switch for starting communication when a call is made or received.

The antenna 115 is a whip antenna for tuning to transmission and reception radio waves.

The speaker 116 is made up of a piezoelectric device and so on, and performs electric-acoustic conversion of received signals and outputs caller's voices, and a ringer tone to inform the user of incoming-calls.

The incoming-communication lamp 117 is an LED (light-emitting diode) for notifying the user visually of incoming-communication.

The incoming-communication lamp 117 blinks green when there is incoming-communication, and red during recharging of the folding communication terminal 100.

The sub-display 118 is made up of a black and white LED display apparatus and so on, and displays a maximum of approximately 10 characters. The sub-display 118 is for displaying a stand-by screen which includes the time and the electric field intensity, and also for displaying part of information from amongst the information regarding the incoming-communication history (hereinafter "incoming-communication history information") which is displayable within the above-described maximum number of characters (hereinafter "simplified information").

The simplified information which is displayed on the sub-display 118 is information regarding the latest type of incoming-communication from amongst three types of incoming-communication: calls, e-mail, and c-mail. Here the content displayed is incoming-communication history information about the type of incoming-communication which was received the latest and whose details have not been confirmed by the user. In other words, the number of incoming-communications of the type that have not been displayed on the main display 102, and the time that the last incoming-communication was received.

The open/close detection switch 119 is a micro-switch that detects mechanically whether the folding communication terminal 100 is open or closed.

Figure 2:
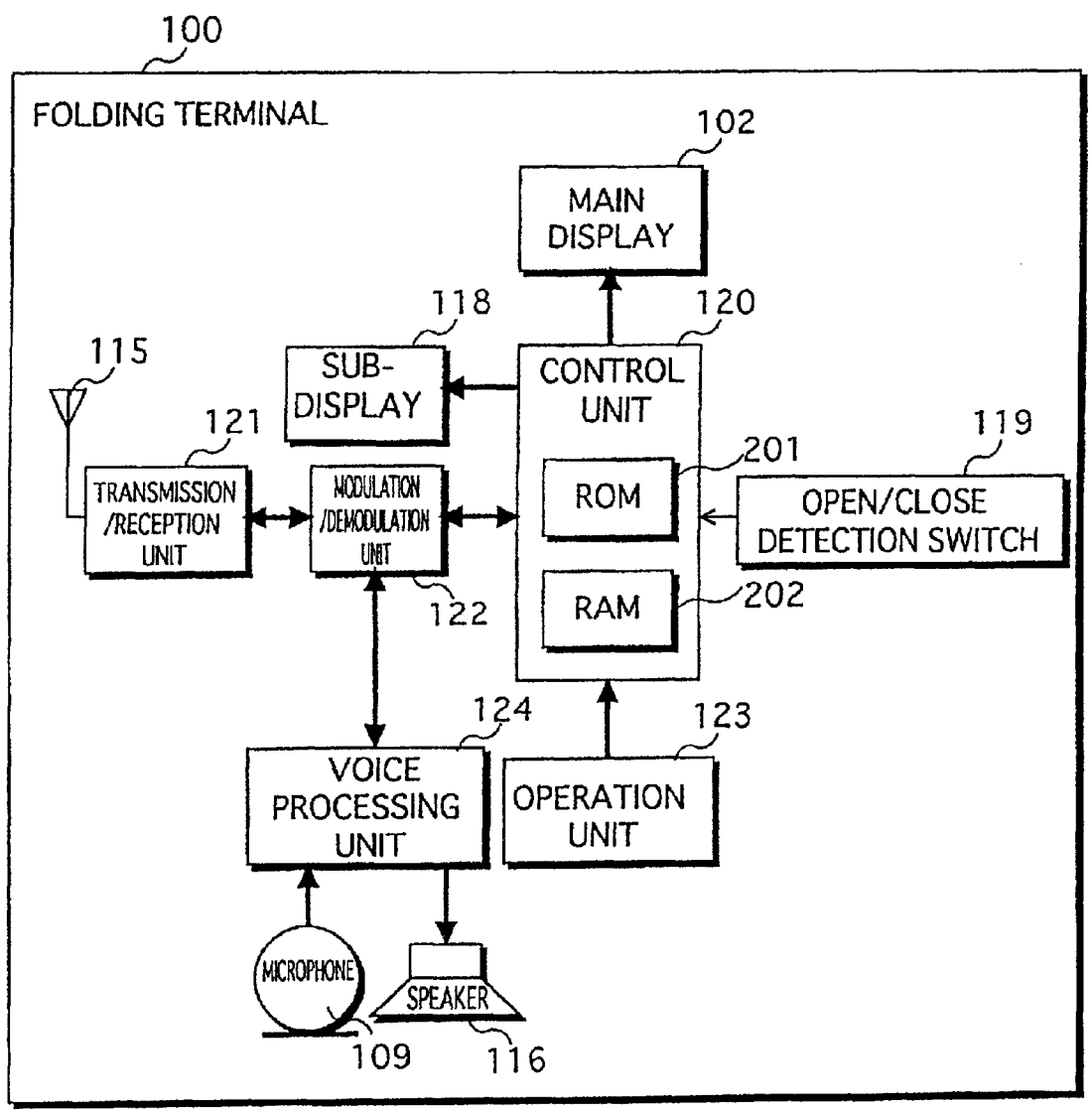
FIG. 2 is a function block drawing of the folding communication terminal of the present invention.

FIG. 2 is a function block drawing showing the structure of the folding communication terminal of the present invention in more detail.

The folding communication terminal 100 has the antenna 115, a transmission/reception unit 121, a modulation/demodulation unit 122, an voice processing unit 124, the microphone 109, the speaker 116, a control unit 120, the main display 102, the sub-display 118, an open/close detection switch 119, and an operation unit 123.

Note that function units which are the same in FIG. 1 have the same numbering here, so an explanation of these will be omitted.

The transmission/reception unit 121 is a circuit made up of a filter, an amplifier and so on, and receives and transmits communication data wirelessly from/to external devices through the antenna 115.

The communication data is voice data including voice in conversations, and characters in e-mail and c-mail (hereinafter c-mail will be referred to as "character message (s)"), and control data which is mainly used for communication control and includes information such as a caller's telephone number and so on.

In addition, this control data includes three types of management information: management information which includes a caller's telephone number sent by the caller when initiating voice communication (hereinafter "call management information"), management information for e-mail transmitted according to an SMS bearer (short message bearer) system (hereinafter "mail management information"), and management information for character messages (hereinafter "message management information").

The management information does not include the main body of the e-mail and so on, but is limited to information specifying the sender/caller, the subject of an e-mail, and so on. The user decides whether to obtain the main body after referring to this information.

In other words, a data transmission method is used in which, for e-mail and character messages, information for specifying the sender's e-mail address, telephone number and so on which is of low capacity and does not incur a charge to obtain arrives first, the user uses this information as a basis to select whether to obtain the main body, and only the selected information is received for a charge.

The modulation/demodulation unit 122 modulates data to be transmitted, and demodulates data which is received.

In addition, the modulation/demodulation unit 122, after extracting voice data from the demodulated data and outputting the voice data to the voice processing unit 124, outputs the above-described data, in other words the control data and the character data, to the control unit 120.

The control unit 120 is composed of a microprocessor and a ROM (read only memory) 201, a RAM (random access memory) 202 for storing data temporarily, and so on. The control unit 120 executes procedures such as making and receiving calls, establishment of calls, and so on, following a control program stored in the ROM 201. In addition, the control unit 120 controls displaying of incoming-communication history information which shows that a call, e-mail, or character mail has been received.

Note that the present invention relates to control for displaying of incoming-communication history information. Since making, receiving, and establishment of calls are commonly known, detailed explanations of these will be omitted.

The control unit 120 stores information from the operation unit 123 (hereinafter "input information") in the RAM. Character information of e-mails and so on in the input information is outputted to the modulation/demodulation unit 122 as transmission data.

In addition, when there is incoming-communication such as voice, e-mail, and character mail from an external device, the control unit 120 notifies the user by, for instance, a beep.

The control unit 120 also executes procedures, according to instructions from the user, for obtaining the data of the incoming-calls, e-mail, and character messages.

The above procedures are the same as conventional procedures.

Regardless of whether there is an incoming-call, e-mail, or character message, if the user is not near the folding communication terminal 100, or notices the incoming-communication but cannot respond, the result is that the folding communication terminal 100 is left as is without the incoming-communication being confirmed.

However, even if the user misses the incoming-communication, it is still possible to confirm what the communication was because control data including a caller's telephone number, a sender's e-mail address or the like is obtained on receiving the communication.

The following explains control for displaying the incoming-communication history information.

The control unit 120 receives the control data and the character data from the modulation/demodulation unit 122, stores the data in the RAM 202, and generates incoming-communication history information based on the control data for each call, e-mail, or character message that is received.

More specifically, when incoming-call management information is included in the control data received from the modulation/demodulation unit 122, the control unit 120 judges whether the call corresponding to the voice management information can be established, in other words whether the user answers the call.

If the call is established the control unit 120 generates information showing that there was an answer (hereinafter "answer information").

On the other hand, if the call cannot be established the control unit 120 generates information showing that there was no response (hereinafter "unanswered information").

The control unit 120 also judges whether the caller's telephone number is included in the voice management information, and if the judgement is affirmative, extracts the telephone number.

On the other hand, if the caller's telephone number is not included in the voice management information, in other words the caller ID is not set, the control unit 120 generates information showing that the caller's identification is not set (hereinafter "caller ID-unset information").

If the telephone number is extracted, the control unit 120 refers to a list of names, e-mail addresses and telephone numbers registered in the RAM 202 and judges whether the extracted telephone number matches any of the telephone numbers in the list.

When there is a matching telephone number the control unit 120 substitutes the extracted telephone number with the name which is in correspondence with the matching telephone number.

Furthermore, the control unit 120 refers to the present time and date on reception of call management information to obtain the reception time and reception date.

The control unit 120 also generates information which stores a value showing the type of incoming-communication (hereinafter "incoming-communication type information"), in this case showing that the incoming-communication type is a call.

The control unit 120 also generates a display flag showing whether the detailed information has been displayed on the main display or not, in this case the value is set to "0".

The control unit 120 corresponds the telephone number, name, or the caller ID-unset information with the answer information or the unanswered information, and then corresponds the reception date, reception time, incoming-communication type information and the display flag and registers the result (hereinafter "incoming-call history information") in a table 400 in the RAM 202. Note that the table 400 will be explained later.

Then, after registering the above items, the control unit 120 counts the number of display flags in the table 400 having the value "0", and registers that number in the table 400 as a communication count.

In other words, the communication count shows the number of pieces of incoming-call history information that have not been displayed on the main display unit 102.

Furthermore, the control unit 120 allocates numbers in the table 400 by corresponding the number 1 with the newest piece of incoming-call history information, in other words that with the latest reception time, and then corresponding successively incrementing numbers to each other piece of incoming-call history information in order from newest to oldest.

The following shows the procedure which takes place in the control unit 120 when mail management information is included in control data received from the modulation/demodulation unit 122.

The control unit 120 judges whether the main body of the mail to which the mail management information corresponds has been read. If the main body has been displayed the control unit 120 generates information showing that the main body has been read (hereinafter "read information").

On the other hand, if the main body has not been displayed the control unit 120 generates information showing that the main body has not been read (hereinafter "unread information").

The control unit 120 then extracts the sender's e-mail address which is included in the mail management information.

After extracting the e-mail address, the control unit 120 refers to the list of names, e-mail addresses, and telephone numbers registered in the RAM 202, and judges whether there is an e-mail address which corresponds to the extracted e-mail address.

When there is a matching e-mail address the control unit 120 substitutes the extracted e-mail address with the name which is in correspondence with the matching e-mail address.

The control unit 120 then obtains the subject of the e-mail from the mail management information.

In addition, on receiving mail management information, the control unit 120 obtains the reception time and the reception date by referring to the present time and date.

The control unit 120 also generates incoming-communication type information which stores a value showing that the incoming-communication type is e-mail.

The control unit 120 then counts the number of pieces of incoming-mail history information showing that e-mail has been received that are stored in the RAM 202, and obtains the number of pieces of incoming-mail history information plus 1. Note that the incoming-mail history information will be explained later.

The control unit 120 also generates a display flag showing whether the detailed information has been displayed on the main display or not, in this case the value is set to "0".

The control unit 120 corresponds the e-mail address or the name with the read information or the unread information, and then corresponds the subject, the reception date, the reception time, the incoming-communication type information and the display flag and registers the result (hereinafter "incoming-mail history information") in a table 500 in the RAM 202. The table 500 will be explained later.

Note that information for identifying a sender/caller such as e-mail address, telephone number, and name, and the caller ID-unset information which is generated instead of the information for identifying a sender/caller are together called "identification information" hereinafter.

After the above-described items are registered, the control unit 120 counts the number of display flags in the table 500 which have the value "0", and registers the number in the table 500 as the communication count.

In other words, the communication count shows the number of pieces of incoming-mail history information that have not been displayed on the main display 102.

Furthermore, the control unit 120 allocates numbers in the table 500 by corresponding the number 1 with the newest piece of incoming-mail history information, in other words that with the latest reception time, and then corresponding successively incrementing numbers to each other piece of incoming-mail history information in order of newest to oldest.

The following shows the procedure in the control unit 120 when message management information is included in control data received from the modulation/demodulation unit 122.

The control unit 120 judges whether the main body corresponding to the message management information has been read.

If the main body has been displayed, the control unit 120 generates information showing that the main body has been read, namely, read information.

On the other hand, if the main body has not been displayed, the control unit 120 generates information that the main body has not been read, namely, unread information.

The control unit 120 also judges whether the caller's telephone number is included in the message management information, and if the judgement is affirmative, extracts the telephone number.

On the other hand, if the caller's telephone number is not included in the voice management information, the control unit 120 generates caller ID-unset information.

If the telephone number is extracted, the control unit 120 refers to a list of names, e-mail addresses and telephone numbers registered in the RAM 202 and judges whether the extracted telephone number matches any of the telephone numbers in the list.

When there is a matching telephone number the control unit 120 substitutes the extracted telephone number with the name which is in correspondence with the matching telephone number.

Furthermore, the control unit 120 refers to the present time and date on reception of the message management information to obtain the reception time and reception date.

The control unit 120 also generates incoming-communication type information which stores a value showing that the incoming-communication type is character message.

Then the control unit 120 counts the number of pieces of incoming-message history information showing that a message has been received that are stored in the RAM 202, and obtains the number of pieces of incoming-message history information plus 1. Note that the incoming-message history information will be explained later.

The control unit 120 also generates a display flag showing whether the detailed information has been displayed on the main display or not, and in this case the value is set to "0".

The control unit 120 then corresponds the telephone number and name or the caller ID-unset information with the read information or the non-read information, and then corresponds the reception data, reception time, incoming-communication type information and the display flag and registers the result (hereinafter "incoming-message history information") in a table 600 in the RAM 202. Note that the table 600 will be explained later.

Then, after registering the above items, the control unit 120 counts the number of display flags in the table 600 having the value "0", and registers that number in the table 600 as a communication count.

In other words, the communication count shows the number of pieces of incoming-message history information that have not been displayed on the main display unit 102.

Furthermore, the control unit 120 allocates numbers in the table 600 by corresponding the number 1 with the newest piece of incoming-message history information, in other words that with the latest reception time, and then corresponding successively incrementing numbers to each other piece of incoming-message history information in order of newest to oldest.

This completes the explanation of how the control unit 120 updates the contents of the tables 400, 500, and 600 on reception of communication.

After updating, when the housing unit 101 is folded, the control unit 120 judges whether a shut signal showing that the housing unit 101 is folded is being input from the open/close detection switch 119. Based on the result of the judgement, the control unit 120 judges where and to what extent the information in the updated table is to be displayed. In other words, the control unit 120 judges which of the main display 102 and the sub-display 118 the information is to be displayed, and displays the information accordingly.

More specifically, when there is a shut signal, the control unit 120 outputs, from amongst the items in the updated table, the incoming-communication type information and the reception time to the sub-display 118 as simplified information, and corresponds the date and the time that the simplified information was output, in other words, simplified information display time.

Accordingly, if there is already other simplified information displayed on the sub-display 118, this simplified information is replaced with the simplified information.

On the other hand, if a shut signal is not being input, the control unit 120 outputs the reception time, the answered/unanswered information or the read/unread information, the reception date of pieces of incoming-communication history information to which the numbers were allotted, and the numbers, to the main display 102 as detailed information. All the values of the display flags in the table corresponding to this output are set to "1", and the value of the communication count is set to "0".

It should be noted that when output to the main display 102 is performed after updating the table 500, the control unit 120 also includes and outputs the subject in the detailed information.

Furthermore, when the shut signal ceases being input during the outputting of the simplified information to the sub-display 118, the control unit 120 terminates the output of the simplified information to the sub-display 118, outputs the detailed information corresponding to the terminated simplified information to the main display 102, sets all the values of the display flags in the table corresponding to the output to "1", and sets the communication count to "0".

In addition, if a shut signal is input while the control unit 120 is outputting the detailed information to the main display 102, the control unit 120 stops the output from amongst the tables 400, 500, and 600 whose count is 1 or more, outputs the simplified information whose display time is latest, and the total count of the pieces of simplified information. Then the control unit 120 corresponds the date and time that it output the simplified information in the same table, in other words the simplified information display time.

Note that since the display content of the main display 102 cannot be confirmed when the housing 101 is close, the main display 102 is turned off at this time. Since when the housing 101 is opened all information regarding the communication history information is displayed on the main display 102, at this time the sub-display unit 118 is turned off. Turning off the display in this manner contributes to power conservation.

The operation unit 123 is made up of the flexible key 103, the 4-position key 104, thee-mail key 105, the menu/OK key 106, the end/power key 107, the numeric key pad 108 the web key 111, the side OK 112, the side scroll key 113, and the start key 114.

The operation unit 123 outputs input information input using the keys to the control unit 120.

The voice processing unit 124 performs D/A conversion and so on of voice data received from the modulation/demodulation unit 122 and outputs the result to the speaker 116.

In addition, the voice processing unit 124 receives voice signals from the microphone 109, performs A/D conversion of the signals, and outputs the results to the modulation/demodulation unit 122.

<Data>

Figure 3:
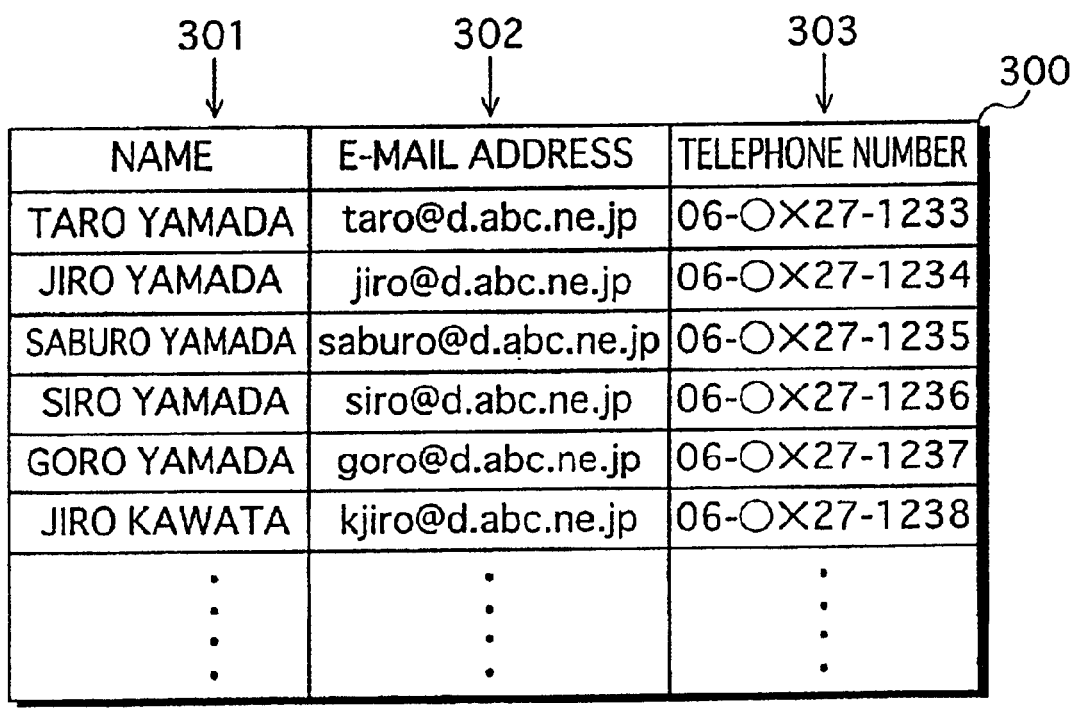
FIG. 3 shows the data structure of a table which shows a so-called address book in which names, e-mail addresses and telephone numbers are in correspondence.

FIG. 3 shows a data structure of a table 300 showing a so-called address book which is stored in the RAM 202 and in which names, e-mail addresses, and telephone numbers are stored in correspondence.

A name column 301 shows the name of each person registered in the address book. An e-mail address column 302 shows the e-mail address of each person, and a telephone number column 303 shows the telephone number of each person.

By using the table 300, not only is the user saved from having to input telephone numbers when making calls and e-mail addresses when transmitting e-mail, but also when a caller's/sender's telephone number or e-mail address is notified, even if the user cannot tell who the caller/sender is just from the telephone number or e-mail address, the caller can be identified quickly because the telephone number or e-mail address in converted to the caller's/sender's name.

Figure 4:
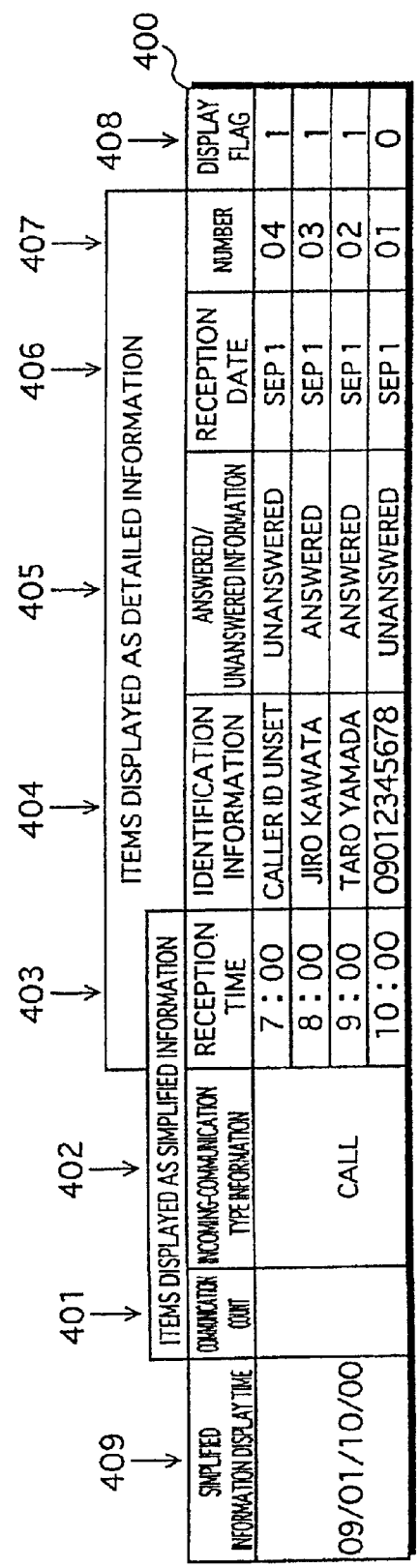
FIG. 4 shows the data structure of a table for registering incoming-call history information.

FIG. 4 shows the data structure of the table 400 for registering incoming-call history information.

An communication count field 401 shows the number of pieces of incoming-call history information which have not yet been displayed on the main display 102, in other words, the number of calls whose value in a display flag column 408, which will be explained later, is "0".

An incoming-communication type information field 402 shows the type of information stored in the table, and here "call" is shown, expressing incoming-call history information.

A reception time column 403 shows the time that control data which includes incoming-call history information was received.

A identification information column 404 basically shows callers' telephone numbers, but if a telephone number is registered in the table 300, the caller's name is registered instead of the telephone number.

Note that if a caller's ID is unset, the caller's telephone number is not stored. Instead this is indicated by "caller ID unset".

A answered/unanswered information column 405 shows whether or not the user answered to an incoming-call corresponding to reception of control data which includes incoming-call history information.

A reception date column 406 shows the date on which control data which includes incoming-call history information was received.

A number column 407 shows numbers allocated successively to incoming-call history information in order of latest to earliest.

Note that the information shown in the reception time column 403 through to the number column 407 is the information displayed on the main display 102 as detailed information.

The display flag column 408 shows whether or not incoming-call history information has been displayed on the main display 102. For example, if the housing 101 is open and conversation is initiated when a call is received, either the caller's telephone number, the caller's name, or caller ID unset is displayed on the main display 102, therefore the value of the display flag of the corresponding incoming-call history information becomes "1".

Furthermore, if the housing 101 is opened while simplified content is displayed on the sub-display 118, the incoming-call history information of all the calls registered in the table 400 is displayed on the main display 102, therefore the value of all the display flags becomes "1".

A simplified information display time field 409 shows the date and time that simplified information about the incoming-call history information was last displayed on the sub-display 118.

Note that the information shown in the incoming-communication count field 401 and the incoming-communication type information field 402, and information shown in the reception time column 403 for call history information of which the value of the display flag column 408 is "0" are displayed on the sub-display 118 as simplified information.

FIG. 5 shows the data structure of the table 500 for registering incoming-mail history information.

An incoming-communication count field 501 shows a number of pieces of incoming-mail history information that have not yet been displayed on the main display 102, in other words the number of values "0" in a display flag column 509, which will be explained later.

An incoming-communication type information field 502 shows what type of information is stored in the table, and here "e-mail" shows that the type is incoming-mail history information.

The reception time column 503 shows the time that control data which includes incoming-mail history information was received.

A identification information column 504 basically shows senders' e-mail addresses, but if an e-mail address is registered in the table 300, the sender's name is registered instead of the e-mail address.

A subject column 505 shows a subject given to each e-mail by the sender.

An read/unread information column 506 shows whether the main body of each e-mail has been read or not.

A reception date column 507 shows the data that each piece of control data which includes incoming-mail history information was received.

A number column 508 shows numbers allocated successively to incoming-mail history information starting with the latest.

The display flag column 509 shows whether or not incoming-mail history information has been displayed on the main display 102. For example, if the housing 101 is open when an e-mail is received, the sender's e-mail address or the sender's name, and the subject are displayed on the main display 102, therefore the value of the display flag of the corresponding incoming-mail history information becomes "1".

Furthermore, if the housing 101 is opened while simplified content is displayed on the sub-display 118, the incoming-mail history information of all the e-mails registered in the table 500 are displayed on the main display 102, therefore the value of all the display flags becomes "1".

Note that the folding communication terminal 100 of the present invention can directly obtain the main body corresponding to a piece of incoming-mail history information without displaying the detailed information by the user performing an operation from the initial screen which is displayed on the main display 102. When such a procedure is performed the value of only the display flag of the displayed incoming-mail history information becomes "1".

Therefore, it is possible that pieces of incoming-mail history information that are older than the piece of incoming-mail history information whose value of the display flag is "1" have a display flag whose value is "0".

A simplified information display time field 510 shows the date and time that simplified information about the incoming-mail history information was last displayed on the sub-display 118.

Note that the information shown in the number of communications field 501 and the incoming-communication type information field 502, and information shown in the reception time column 503 for incoming-mail history information of which the value of the display flag column 509 is "0" are displayed on the sub-display 118 as simplified information.

Figure 6:
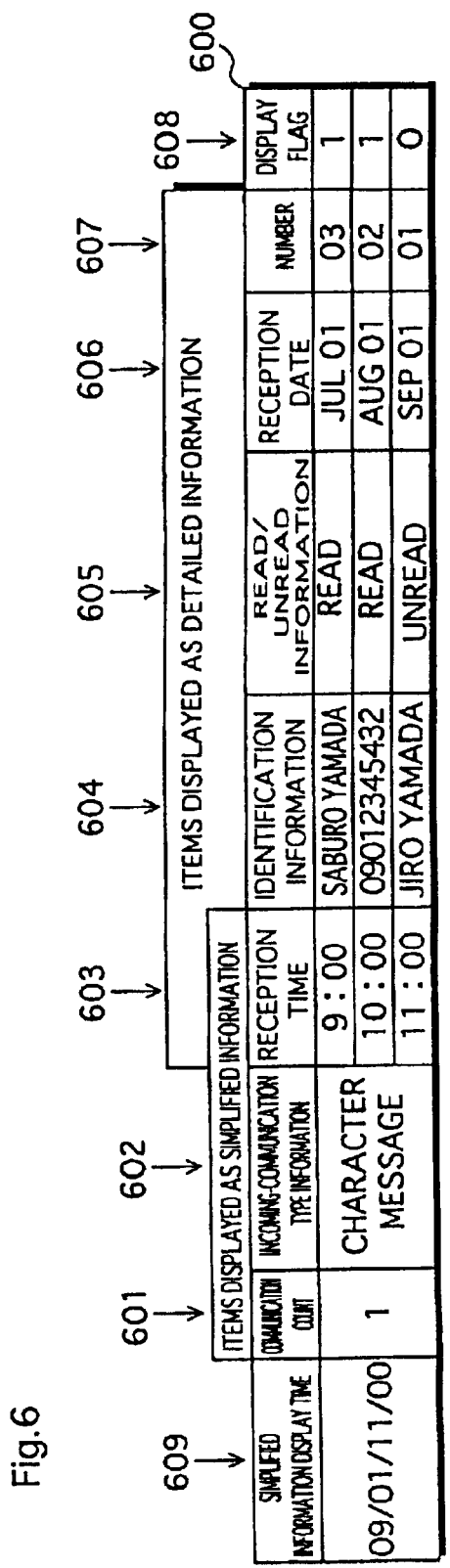
FIG. 6 shows the data structure of a table for registering incoming-message history information.

FIG. 6 shows the data structure of the table 600 for registering incoming-message history information.

A communication count field 601 shows the number of pieces of incoming-message history information that have not yet been displayed on the main display 102, in other words the number of values "0" in a display flag column 608, which will be explained later.

An incoming-communication type information field 602 shows what type of information is stored in the table, and here "character message" shows that the type is incoming-message history information.

The reception time column 603 shows the time that control data which includes incoming-message information was received.

An identification information column 604 basically shows senders' e-mail addresses, but if a telephone number is registered in the table 300, the sender's name is registered instead of the telephone number, in the same manner as table 400.

An read/unread information column 605 shows whether or not the main body of the character message corresponding to reception of control data which includes incoming-message history information has been read.

A reception date column 606 shows the date on which control data which includes incoming-message history information was received.

A number column 607 shows numbers allocated successively to incoming-message history information in order of latest to earliest.

The display flag column 608 shows whether or not incoming-message history information has been displayed on the main display 102. For example, if the housing 101 is open when a character message is received, either the sender's telephone number or the sender's name is displayed on the main display 102, therefore the value of the display flag of the corresponding incoming-message history information becomes "1".

Furthermore, if the housing 101 is opened while simplified content is displayed on the sub-display 118, the incoming-message history information about all the character messages registered in the table 600 is displayed on the main display 102, therefore the value of all the display flags becomes "1".

A simplified information display time field 609 shows the date and time that simplified information about the incoming-message history information was last displayed on the sub-display 118.

Note that the information shown in the reception time column 603 to the number column 607 is displayed on the main display 102 as detailed information. The information in the communication count field 601 and the incoming-communication type information field 602, and information shown in the reception time column 603 for incoming-message history information whose value is "0" in the display flag column 608 are displayed on the sub-display a simplified information.

Note that the value in the display flag column 408 in FIG. 4, the value in the display flag column 509 in FIG. 5, and the value in the display flag column 608 in FIG. 6 show whether detailed information about each of the types of incoming-communication history information have been displayed on the main display 102 or not. In the following those whose flag value is "0" will be referred to as "undisplayed detailed information".

<Display>

Next the display contents of the sub-display 118 will be explained.

The folding communication terminal 100 performs position registration by transmitting and receiving signals in a set order to/from a base station which is not illustrated, according to control by the control unit 120, and then moves into stand-by.

Figure 7:
FIG. 7 shows how the display state of the sub-display changes while the housing is closed.

FIG. 7 shows changes in the display contents of the sub-display when the housing is in a folded state.

FIG. 7(A) shows the default screen displayed on the sub-display 118 in stand-by. The default screen shows the current time "9:30" and an antenna pictograph which corresponds to the electric field strength.

The folding communication terminal 100 has a timer and an RSSI (received signal strength indication) detector unit (not illustrated) as function units for detecting the time and the electric field strength.

Note that the control unit 120 may display icons to show settings of the terminal or that e-mail has been received in the blank space to the left of the time display.

FIG. 7(B) shows another screen on the sub-display 118 in stand-by, and shows a state of displaying after the screen in (A) in a case in where a call was received at 10:00 but the call was not answered.

Thus, this screen shows that the detailed information about the call has not been displayed, and that there is a total of one call for which the detailed information has not been displayed.

FIG. 7(C) shows a screen on the sub-display 118 in stand-by after the screen (B), showing a state in which despite an e-mail being received at 10:30, confirmation of the e-mail has not been made.

Thus, this screen shows that the detailed information about the e-mail has not been displayed, and that there is a total of one e-mail for which the detailed information has not been displayed.

FIG. 7(D) shows a screen on the sub-display 118 in stand-by after the screen (C), showing a state in which despite a c-mail being received at 11:00, confirmation of this c-mail has not been made.

Thus, this screen shows that the detailed information about the c-mail has not been displayed, and that there is a total of one c-mail for which the detailed information has not been displayed.

FIG. 7(E) shows a screen on the sub-display 118 in stand-by after the screen (D), showing a state in which despite an e-mail being received at 11:30, confirmation of this e-mail has not been made.

In this case the e-mail received here and the e-mail received previously mean that there are two e-mails for which the detailed information has not been displayed.

As the folding communication terminal 100 receives each communication successively in the order shown from (B) through to (E), the control unit 120 writes information showing that the detailed information has not been displayed, in other words the control unit 120 writes detailed undisplay information to the tables 400, 500, and 600 in the RAM 202.

Note that the default screen in (A) will be called a "stand-by simplified screen" hereinafter.

Next, the display contents of the maim display 102 will be explained.

Here, if the display state is currently that of (E) in FIG. 7 and the user opens the folding communication terminal 100, the control unit 120 recognizes, according to the signal input from the open/close detection switch 119 ceasing, that the housing 101 has been opened, in other words that the housing 101 is in the state in FIG. 1a, and stops displaying on the sub-display 118.

FIG. 8 shows the display state of the main display when the housing is opened while incoming-mail history information in being displayed on the sub-display, and the display state of the sub-display when the housing is subsequently closed.

The control unit 120, on terminating the display on the sub-display 118, displays the detailed information about the e-mail on the main display 102 as shown in FIG. 8(A). This is because the control unit 120 was displaying on the sub-display 118 that an e-mail had been received.

Then, the control unit 120 changes the value of the display flag to incoming-mail history information amongst the undisplay detailed information stored in the RAM 202 to "1".

According to this procedure, the information shown in (C) and (E) in the FIG. 7 regarding the incoming-mail history information will no longer be displayed on the sub-display 118.

FIG. 8(A) shows that the unread e-mails are e-mail number 001 that arrived on September 1 at 10:30 from Taro Yamada, and whose subject is "The other day", and e-mail number 002 that arrived on September 1 at 11:30 from jiro@aaa.bbb.co.jp, and whose title is "Meeting".

Note that the e-mail number 001 is surrounded by a rectangular frame. This is to express that number 001 is highlighted, and shows that number 001 is selected.

Furthermore, if the menu/OK key 106 is pressed in this state the contents of the e-mail number 001 are displayed. Other e-mail can be selected by operations of the 4-position key 104 up and down.

Note that an icon showing the amount of battery left is displayed in the top left of the screen.

If the user closes the folding communication terminal 100 after the state shown in (A) or the content of the e-mail is displayed, the control unit 120 recognizes according to an input of a signal from the open/close detection switch 119 that the housing 101 has been closed. The control unit 120 turns off the main display 102 and refers to the simplified information display time in the tables 400, 500, and 600 of incoming-communication types whose communication count that have not been displayed as detailed information on the main display 102 is 1 or more. The control unit 120 selects the one whose simplified information display time is latest, here FIG. 7(D), and, as shown by FIG. 8(B), displays that a c-mail, in other words a character message, was received at 11:00.

Next, if the user opens the folding communication terminal 100 in the state shown by (B) in FIG. 8, the control unit 120 recognizes, according to the signal input from the open/close detection switch 119 ceasing, that the housing 101 has been opened and terminates the display on the sub-display 118.

FIG. 9 shows the display state of the main display when the housing is opened while incoming-message history information is being displayed on the sub-display, and the display state of the sub-display when the housing is subsequently closed.

The control unit 120, on terminating the display on the sub-display 118, displays the detailed information about the character message on the main display 102 as shown in FIG. 9(A). This is because the control unit 120 was displaying on the sub-display 118 that a character message had been received.

Then, the control unit 120 changes the value of the display flag of incoming-message history information amongst the detailed undisplay information stored in the RAM 202 to "1".

According to this procedure, the information shown in FIG. 7(D) regarding the incoming-message history information will no longer be displayed on the sub-display 118.

FIG. 9(A) shows that an unread character message arrived on September 1 at 11:00, and that six other character messages have been received.

The respective reception times and dates are shown for the six other character messages and it is also shown that each of the other character messages has been read.

Note that the top, unread character message is surrounded by a rectangular frame. This is to express that the character message is highlighted, and shows that the character message is selected.

If the menu/OK key 106 is pressed in this state the contents of the character message are displayed. Other e-mail can be selected by operations of the 4-position key 104 up and down.

If the user closes the folding communication terminal 100 after the state in (A), or the content of the character message is displayed, the control unit 120 recognizes according to an input of a signal from the open/closed detection switch 119 that the housing 101 has been closed. The control unit 120 turns off the main display 102 and refers to the simplified information display time in the tables 400, 500, and 600 of incoming-communication types whose communication count that have not been displayed as detailed information on the main display 102 is 1 or more. The control unit 120 selects the one whose simplified information display time is latest, here in FIG. 7(B), and, as shown in FIG. 9(B), displays that a call was received at 10:00.

Next, if the user opens the folding communication terminal 100 in the state shown by FIG. 9(B), the control unit 120 recognizes, according to the signal input from the open/close detection switch 119 ceasing, that the housing 101 has been opened and terminates the display on the sub-display 118.

FIG. 10 shows the display state of the main display when the housing is opened while incoming-call history information is being displayed on the sub-display 118, and the display state of the sub-display 118 when the housing is subsequently closed.

The control unit 120, on terminating the display on the sub-display 118, displays history information about the call, in other words the incoming-call history information, on the main display 102 as shown in (A) of FIG. 10. This is because the control unit 120 was displaying on the sub-display 118 that a call had been received.

Then, the control unit 120 changes the value of the display flag of incoming-call history information amongst the detailed undisplay information stored in the RAM 202 to "1".

According to this procedure, the information shown in FIG. 7(B) regarding the incoming-call history information will no longer be displayed on the sub-display 118.

FIG. 10(A) shows that at number 01 a call which was not answered arrived on September 1 at 11:00 from a telephone number 09012345678, and that calls number 02, 03, and 04 were also received before the call number 001. "Answered" indicates calls that the user answered, and "missed" indicates calls that the user did not answer.

Note that the top, unanswered call is surrounded by a rectangular frame. This is to express that the call is highlighted, and shows that the call is selected.

If the start key 114 is pressed in this state the control unit 120 starts a procedure to make a call to the displayed telephone number.

If the user closes the folding communication terminal 100 after the state in (A) or the content of the character message is displayed, the control unit 120 recognizes according to an input of a signal from the open/closed detection switch 119 that the housing 101 is closed. The control unit 120 turns off the main display 102 and refers to the simplified information display time in the tables 400, 500, and 600 of incoming-communication types whose incoming-communication count that have not been displayed as detailed information on the main display 102 is 1 or more. The control unit 120 tries to select the one whose simplified information display time is latest.

However, the number of communications in the tables 400, 500, and 600 which have not been displayed on the main display 102 is zero. Since there is no communication to display, the control unit 120 displays the ordinary standby display, in other words the default display shown by FIG. 10(B): a present time "12:00" and an antenna pictograph showing the current electric field intensity.

Next, if the user opens the folding communication terminal 100 in the state shown by (B) in FIG. 10, the control unit 120 recognizes, according to the signal input from the open/close detection switch 119 ceasing, that the housing 101 has been opened and stops displaying on the sub-display 118, and displays an initial screen (hereinafter "stand-by detailed screen") on the main display 102 for aiding user operations in stand-by.

<Operations>

The following explains the operations of the folding communication terminal 100.

Figure 11:
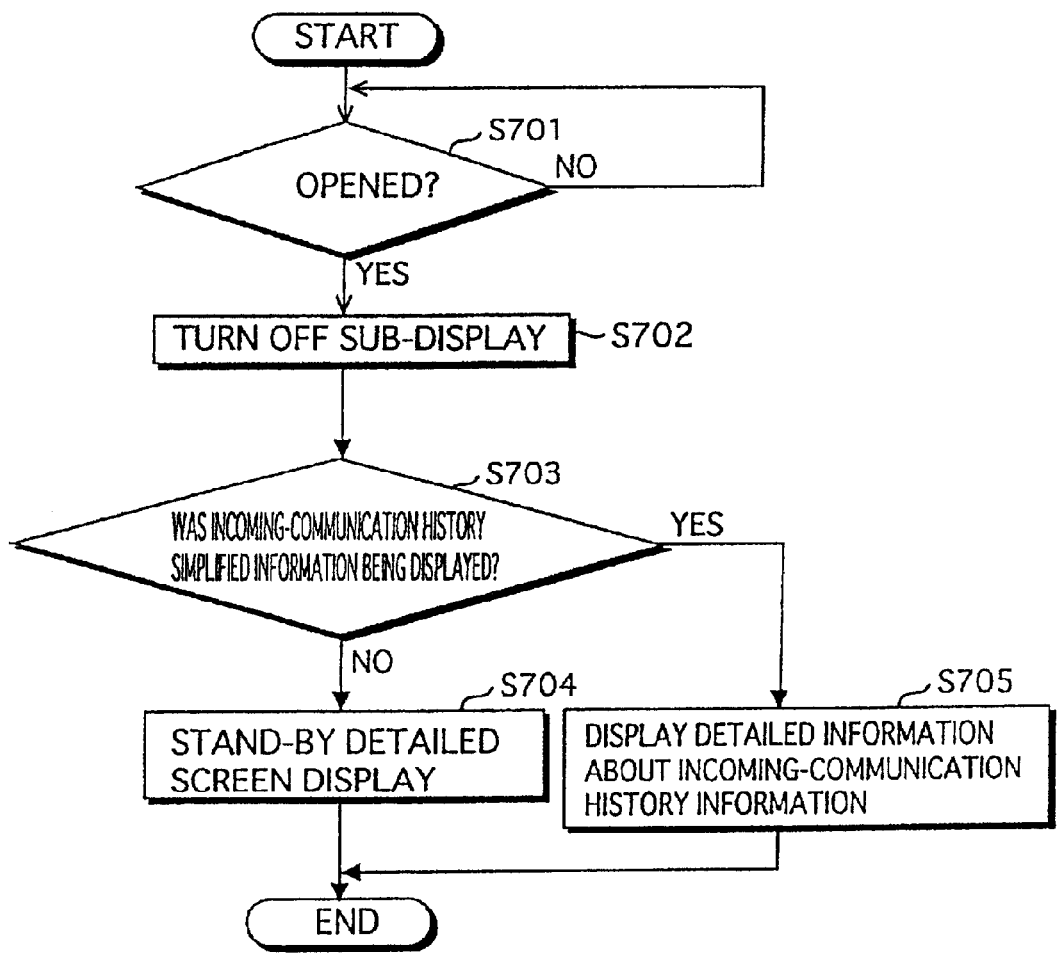
FIG. 11 is a flowchart showing the procedure by the control unit for displaying on the main display.

FIG. 11 is a flowchart showing the procedure by the control unit 120 for displaying on the main display 102.

The control unit 120 judges whether the signal being input from the open/close detection switch 119 has ceased (step S701), and waits until the signal being input from the open/close detection switch 119 ceases. When the signal has ceased, the control unit 120 turns off the sub-display 118 (step S702), and judges whether simplified information regarding incoming-communication history information was being displayed on the sub-display 118 (step S703).

When simplified information regarding incoming-communication history information was not being displayed on the sub-display 118, the control unit 120 displays the stand-by detailed screen on the main display 102 (step S704), and ends the procedure.

On the other hand, if simplified information regarding the incoming-communication history information was being displayed on the sub-display 118, the control unit 120 displays the detailed information related to the simplified information about the incoming-communication history information on the main display 102 (step S705), and ends the procedure.

Figure 12:
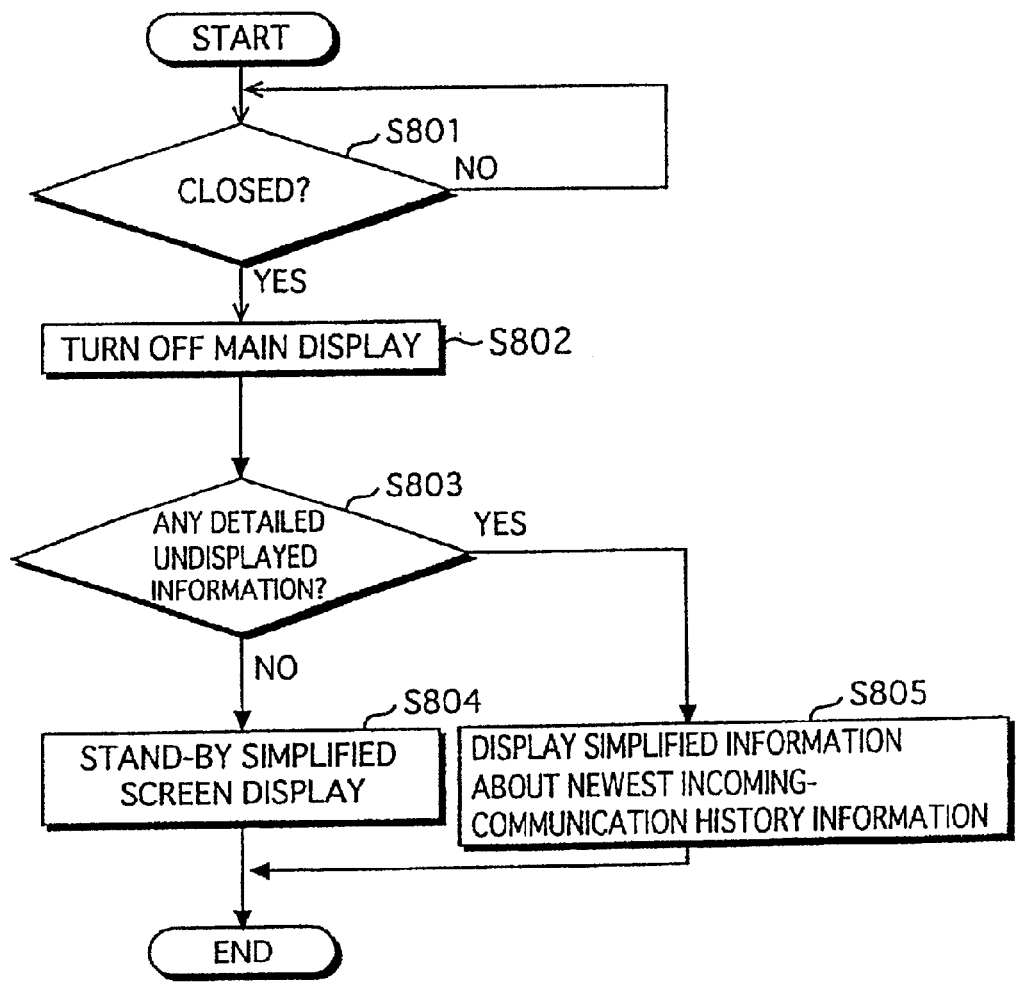
FIG. 12 is a flowchart showing the procedure by the control unit for displaying on the sub-display.

FIG. 12 is a flowchart showing procedure by the control unit 120 for displaying on the sub-display 118.

The control unit 120 judges whether a signal is being input from the open/close detection switch 119 (step S801), and waits for input of a signal from the open/close detection switch 119 to start. When the signal starts, the control unit 120 turns off the main display 102 (step S802), and judges whether there is any detailed undisplay information, in other words any whose value of the display flag is "0" (step S803).

When there is no detailed undisplay information the control unit 120 displays the stand-by simplified screen on the sub-display 118 (step S804), and ends the procedure.

On the other hand, if there is detailed undisplay information, the control unit 120 refers to the incoming-communication type information that has not been displayed on the main display 102 as detailed information and whose incoming-communications count is 1 or more, and displays the simplified information for the incoming-communication is the latest (step S805), and ends processing.

As explained above, in the folding communication terminal 100 in the present embodiment, when simplified information is displayed on the sub-display 118, if the housing 101 is opened, detailed information regarding the simplified information is displayed on the main display 102. Therefore cumbersome operations are unnecessary.

Furthermore, if the terminal is closed when detailed information is being displayed on the main display 102, simplified information which has not been checked by the user is displayed on the sub-display 118 in chronological order. This means that the user can easily know of the existence of unchecked communications.

In addition, if the housing 101 is opened in this state, the detailed information is displayed on the main display 102 in the same manner as stated above.

Note that although a micro-switch for detecting mechanically whether the folding communication terminal 100 is open or closed is used in the present embodiment, an optical sensor that detects that the housing 101 is open, or an encoder that detects the angle, and the like may be used.

Furthermore, the folding communication terminal 100 uses a data transfer method in which e-mail and character messages are selectively obtainable based on information such as the sender's mail address and telephone number, however, a data transfer method in which the whole of e-mail and character messages is received may be used. In such a case it is possible to display the main body as the detailed information.

Furthermore, in the present embodiment the main display 102 is not limited to being the described LCD, but may be for instance an organic EL (electroluminescent).

Furthermore, in the present embodiment the sub-display 118 is a black and white LCD, but it may be a color LCD, or for instance, an organic EL.

Furthermore, is the embodiments the sub-display 118 is shown as being on the outer face of the top housing 101a, but it is possible to position the sub-display 118 on the outer face of the bottom housing 101b.

Furthermore, in addition to portable communication devices of the open/close-type such as that shown in the embodiments in which the housing is made of two parts hinged together and the lid of the housing opens and closes with the hinge as the pivot, in recent years there are also portable communication devices which open and close by sliding the lid of the housing. The present invention is also valid for the sliding open/close-type portable communication devices.

When the present invention is a sliding pen/close-type portable communication device, in the specification the "housing" should be read to mean the aforementioned "lid", "fold" should be read to mean "close (the lid)", and "open" should be read to mean to "open (the lid)".

Here, for convenience, the two aforementioned types of portable communication devices are both considered to be open/close communication terminals.

Although the present invention has been fully described by way of examples with reference to accompanying drawings, it is to be noted that various changes and modifications will be apparent to those skilled in the art. Therefore, unless such changes and modifications depart form the scope of the present invention, they should be construed as being included therein.

What is claimed is:

1. A folding-type communication terminal, comprising:
   first display means which is positioned so as to be visible when a main body of the communication terminal is in a folded state;
   second display means which is positioned so as to be concealed when the main body is in the folded state;
   storage means for storing at least one set of a piece of first information and a piece of second information, the piece of first information (i) having been generated based on information received accompanying incoming-communication, the incoming-communication being at least one of an unanswered incoming-call and incoming-mail, the incoming-mail being one of electronic mail and a character message and (ii) showing existence of the received information, and the second information showing details of the received information;
   detection means for detecting that the main body has been put into an unfolded state;
   first display control means for having the piece of first information displayed on the first display means; and
   second display control means for having the piece of second information displayed on the second display means, when the detection means detects that the main body has been put into the unfolded state while the piece of first information is being displayed on the first display means, wherein the piece of second information belongs to a same set as the piece of first information.

2. The communication terminal of claim 1
   wherein the first display control means further terminates a display of the piece of first information on the first display unit, after the detection means detects that the main body has been put into the unfolded state.

3. The communication terminal of claim 2
   wherein the detection means further detects that the main body has been put into the folded state,
   and the first display control means has, after the detection means detects that the main body has been put into the folded state, another piece of first information displayed on the first display means until the detection means detects that the main body has been put into the unfolded state.

4. The communication terminal of claim 3
wherein the first display control means prohibits the piece of first information from being displayed again on the first display means after the display of the piece of first information has been terminated.

5. The communication terminal of claim 4, further comprising:
generation means for generating, when the incoming-communication is received, the set of the pieces of information, based on the information received accompanying the incoming-communication,
wherein the first display control means has, when the generation means has generated the set of pieces of information, the piece of first information displayed on the first display means in place of a piece of first information that was being displayed on the first display means when the incoming-communication was received.

6. The communication terminal of claim 5, further comprising:
display sequence storage means for storing a display sequence showing an order in which pieces of first information have been displayed on the first display means up until a present time,
wherein a piece of first information to be displayed after the detection means detects that the main body has been put into the folded state is a piece of first information that is one before in the display sequence to a piece of first information that was being displayed until the detection means detected that the main body had been put into the folded state.

7. The communication terminal of claim 4, further comprising:
display sequence storage means for storing a display sequence showing an order in which pieces of first information have been displayed on the first display means up until a present time,
wherein a piece of first information to be displayed after the detection means detects that the main body has been put into the folded state is a piece of first information that is one before in the display sequence to a piece of first information that was being displayed until the detection means detected that the main body had been put into the folded state.

8. An open/close-type communication terminal having a lid which covers a main body of the communication terminal, the lid opening and closing by (a) sliding, or (b) pivoting on a hinge to which the lid is attached, comprising:
first display means which is positioned so as to be visible when the lid is in a closed state;
second display means which is positioned so as to be concealed when the lid is in the closed state;
storage means for storing at least one set of a piece of first information and a piece of second information, the piece of first information (i) having been generated based on information received accompanying incoming-communication, the incoming-communication being at least one of an unanswered incoming-call and incoming-mail, the incoming-mail being one of electronic mail and a character message and (ii) showing existence of the received information, and the second information showing details of the received information;
detection means for detecting that the lid has been put into an open state;
first display control means for having the piece of first information displayed on the first display means; and
second display control means for having the piece of second information displayed on the second display means, when the detection means detects that the lid has been put into the open state while the piece of first information is being displayed on the first display means, wherein the piece of second information belongs to a same set as the piece of first information.

9. An information display method for displaying information, being for use with a folding-type communication terminal comprising (a) first display means which is positioned so as to be visible when a main body of the communication terminal is in a folded state, (b) second display means which is positioned to as to be concealed when the main body is in the folded state, and (c) storage means, the information display method comprising:
a detection step for detecting that the main body has been put into an unfolded state;
a generation step for generating, when incoming-communication is received, a set of a piece of first information and a piece of second information, and storing the generated set in the storage means, the piece of first information (i) being generated based on information received accompanying the incoming-communication, the incoming-communication being at least one of an unanswered incoming-call and incoming-mail, the incoming-mail being one of electronic mail and a character message and (ii) showing existence of the received information, and the second information showing details of the received information;
a first display step for having the piece of first information displayed on the first display means; and
a second display step for having the piece of second information displayed on the second display means, after the detection step detects that the main body has been put into the unfolded state while the piece of first information is being displayed on the first display means, wherein the piece of second information corresponds to the piece of first information.

10. The information display method of claim 9 further comprising:
a display termination step for terminating a display of the piece of first information on the first display means, after the detection step detects that the main body has been put into the unfolded state.

11. The information display method of claim 10
wherein the storage means stores a plurality of sets, and the information display method further comprises:
a folded detection step for detecting that the main body has been put into the folded state; and
a third display step for having, after the folded detection step detects that the main body has been put into the folded state, another piece of first information displayed on the first display means until the main body is detected to have been put into the unfolded state.

12. The information display method of claim 11 further comprising:
a prohibition step for prohibiting the piece of first information from being displayed again on the first display means after the display of the piece of first information has been terminated.

13. The information display method of claim 12, further comprising:

a fourth display step for displaying, when the generation step has generated the set of the pieces of information, the piece of first information which belongs to the generated set of pieces of information on the first display means in place of a piece of first information that was being displayed on the first display means when the incoming-communication was received.

14. The information display method of claim 13 wherein the communication terminal further comprises:

display sequence storage means for storing a display sequence showing an order in which pieces of first information have been displayed on the first display means up until a present time, and in the fourth step, a piece of first information to be displayed after the main body is detected to have been put into the folded state is a piece of first information that is one before in the display sequence to a piece of first information that was being displayed when the detection means detects that the main body had been put into the folded state.

15. The information display method of claim 12 wherein the communication terminal further comprises:

display sequence storage means for storing a display sequence showing an order in which pieces of first information have been displayed on the first display means up until a present time, and in the fourth step, a piece of first information to be displayed after the main body is detected to have been put into the folded state is a piece of first information that is one before in the display sequence to a piece of first information that was being displayed when the detection means detects that the main body had been put into the folded state.

16. A computer-readable program for displaying information on a folding-type communication terminal, the communication terminal comprising (a) first display means which is positioned so as to be visible when a main body of the communication terminal is in a folded state, (b) second display means which is positioned so as to be concealed when the main body is in the folded state, and (c) storage means, the program comprising:

a detection step for detecting that the main body has been put into an unfolded state;

a generation step for generating, when incoming-communication is received, a set of a piece of first information and a piece of second information, and storing the generated set in the storage means, the piece of first information (i) being generated based on information received accompanying the incoming-communication, the incoming-communication being at least one of an unanswered incoming-call and incoming-mail, the incoming-mail being one of electronic mail and a character message and (ii) showing existence of the received information, and the second information showing details of the received information, and a first display step for having the piece of first information displayed on the first display means; and a second display step for having the piece of second information displayed on the second display means, after the detection step detects that the main body has been put into the unfolded state while the piece of first information is being displayed on the first display means, wherein the piece of second information corresponds to the piece of first information.

17. A portable communication terminal to enable a user to receive and send data in various visual and audio formats, comprising:

a housing;

a first display unit mounted on a predetermined exterior of the housing to be visible by a user without requiring an interactive action by the user;

a second display, larger than the first display, mounted on the housing and activated for display by an act of the user;

a transmission/reception unit for enabling the receipt and sending of data;

a control unit for executing procedures to enable the transmission/reception unit and the display of data on the first display unit and the second display; and a storage unit for storing at least one set of a piece of first information capable of display on the first display unit and a piece of second information capable of display on the second display, the control unit generates the piece of first information based on management information accompanying an incoming-communication to provide indicia indicative of the content of the incoming-communication, the control unit executing a procedure to address at least one of an unanswered incoming-call and incoming-mail, the incoming-mail being one of electronic mail and a character message, the one piece of second information shows details of the received information processed by the control unit, wherein the one piece of second information belongs to a same set of information accompanying the incoming-communication as the piece of first information.

18. The portable communication terminal of claim 17 wherein the control unit prohibits the display of the piece of first information on the first display after it has been initially displayed on the first display and the display of the piece of first information is terminated.

19. The portable communication terminal of claim 17 further including a display sequence unit to display a predetermined order of pieces of first and second information that are coordinated with the type of communication, a time of receipt of the most recent incoming-communication is set as the highest priority in the sequence of display.

* * * * *